United States Patent [19]
Gretz

[11] Patent Number: 6,114,631
[45] Date of Patent: Sep. 5, 2000

[54] SWIVEL FITTING

[75] Inventor: Thomas J. Gretz, Clarks Summit, Pa.

[73] Assignee: Arlington Industries, Inc., Scranton, Pa.

[21] Appl. No.: 09/187,121

[22] Filed: Nov. 5, 1998

[51] Int. Cl.[7] .................................................. H02G 3/18
[52] U.S. Cl. ..................... 174/65 R; 174/68.1; 174/64; 174/50.52; 439/320; 439/460; 285/364; 285/921
[58] Field of Search .................... 174/65 R, 64, 174/68.1, 50.52, 845; 220/3.2; 439/320, 460; 285/151.1, 364, 921

[56] References Cited

U.S. PATENT DOCUMENTS

| | | | |
|---|---|---|---|
| 954,504 | 4/1910 | Drew | 285/181 |
| 3,710,911 | 1/1973 | Eidelberg et al. | 174/845 |
| 5,380,052 | 1/1995 | Hendrickson | 285/364 |
| 5,505,503 | 4/1996 | Boivin | 285/364 |
| 5,703,326 | 12/1997 | Yamada et al. | 174/50.52 |
| 5,703,328 | 12/1997 | Johannsen | 174/65 R |

Primary Examiner—Kristine Kincaid
Assistant Examiner—Dhiru R Patel

[57] ABSTRACT

A swivel fitting including a first tubular member and a second tubular member each of said first and said second tubular members having a first and a second end, a first annular flange having radiused corners about said first end of said first tubular member, a recess having radiused corners in a second annular flange about said second end of said second tubular member, said first annular flange and said recess mating upon assembly of said first and second tubular members, an annular threaded portion about said second annular flange, and a coupling nut having an annular ring flange which engages the first annular flange when the coupling nut is tightened upon said threads of the annular threaded portion about the second annular flange.

3 Claims, 2 Drawing Sheets

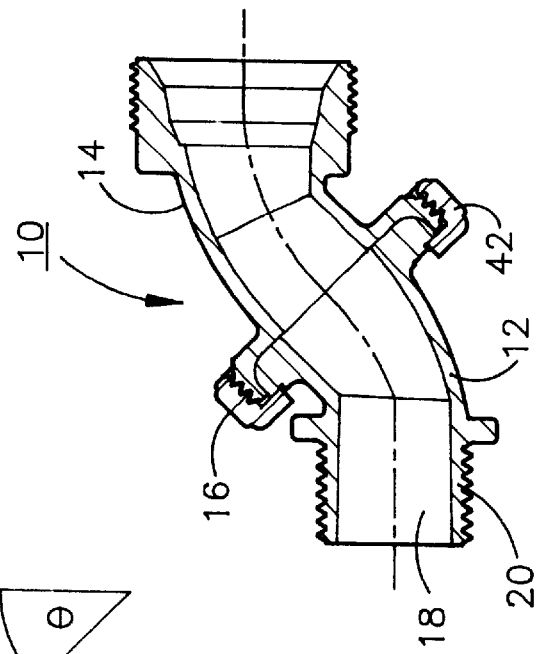
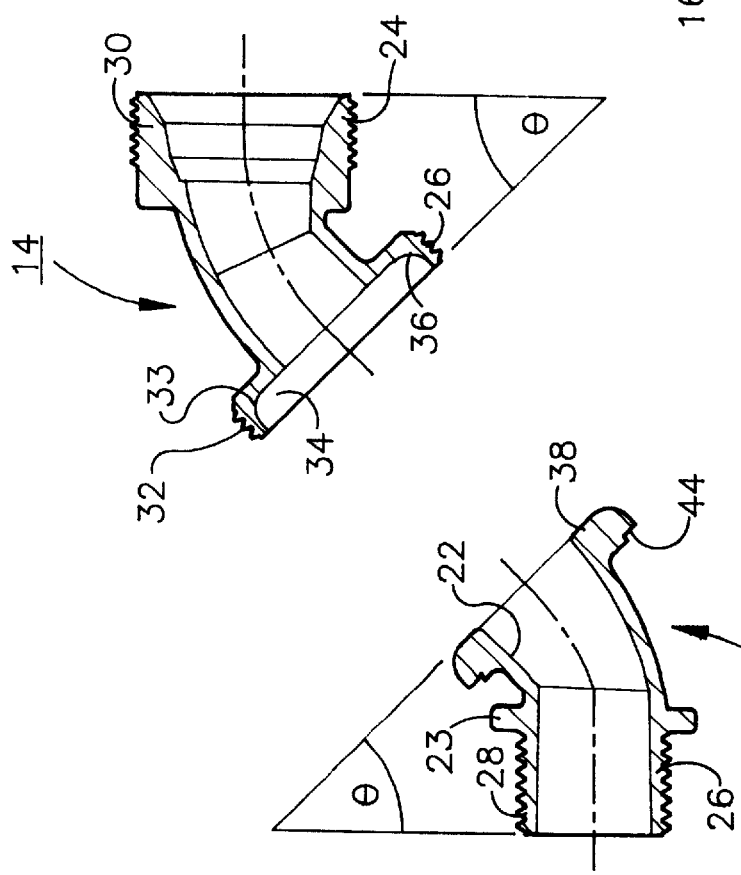
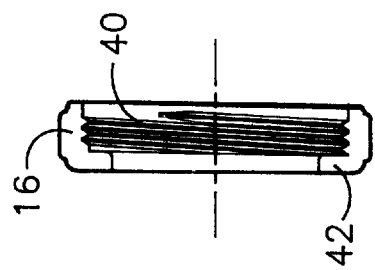

SWIVEL FITTING

FIELD OF THE INVENTION

The present invention relates to an improved, water-resistant fitting for the connection of sections of pipe. More specifically, the invention relates to such a connector or fitting that can be assembled to provide any angular connection from straight to about 90° while assuring a smooth internal conduit surface for the subsequent insertion of cables, wiring, etc.

BACKGROUND OF THE INVENTION

U.S. Pat. No. 2,447,947 to Larson et al issued Aug. 12, 1948 describes a variable pipe coupling for connecting the ends of two pipes in a variety of angles from straight to virtually 90°. It is a stated object of that invention to provide a coupling that does not in any way restrict the flow of fluid passing therein. The design of the Larson coupling is such that, particularly in severely angled configurations, the interior surface defines a bulbous chamber.

U.S. Pat. No. 5,064,226 to Klas issued Nov. 12, 1991 describes a nonmetallic conduit fitting with transverse biasing adjustments which comprises a pair of coaxial, rotatably coupled, straight tubular members having a series of angularly disposed internal latching tabs which permit assembly in a variety of angular configurations.

While the basic design of the Larson coupling is quite satisfactory for fluids, it is relatively unsatisfactory for use as a coupling for electrical conduit. The bulbous chamber referred to hereinabove results in a configuration which, while adequate to provide relatively uninterrupted flow of a fluid, does not provide a smooth transition between coupling segments. Thus, an electrical or communications cable cannot be readily fed therethrough without some twisting, maneuvering or pushing that might damage the wire or cable being so inserted.

The coupling of Klas, while similarly quite useful, is complicated, because of the tabular arrangement, relatively more difficult to assemble and requires the use of an O-ring to provide water resistance.

SUMMARY OF THE INVENTION

According to the present invention, there is provided a swivel fitting for electrical conduit or pipe that while providing the variability of angular configuration of the Larson and Klas couplings, is easy to assemble and also provides a relatively smooth internal conduit for the easy insertion and installation of electrical cable or communications wiring without the need for the application of any undue stress thereon imposed by twisting, maneuvering or hard pushing.

DESCRIPTION OF THE DRAWINGS

The invention will be more fully understood from the following detailed description taken in conjunction with the accompanying drawings which form a part of this application, wherein like numerals refer to like parts and in which:

FIG. 1 is a cross-sectional view of the coupling nut of the variable fitting of the present invention.

FIG. 2 is a cross-sectional view of the first hollow member of the variable fitting of the present invention.

FIG. 3 is a cross-sectional view of the second hollow member of the variable fitting of the present invention.

FIG. 4 is a cross-sectional view of the fitting of the present invention in its assembled configuration providing a straight installation path.

DETAILED DESCRIPTION

Figure 5:
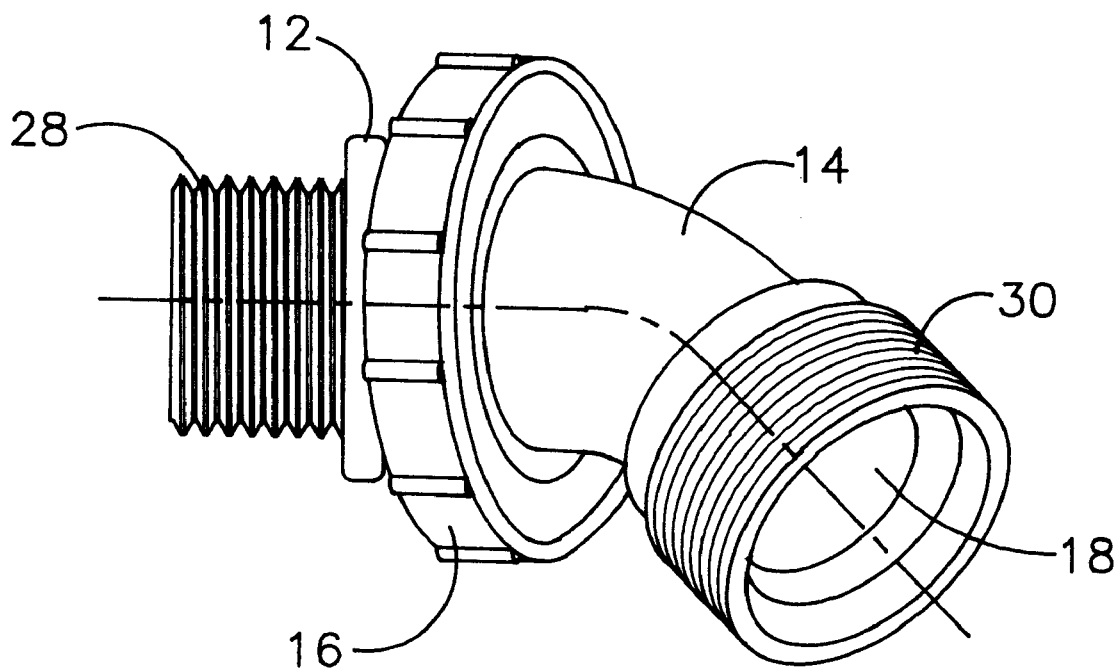
FIG. 5 is a perspective view of the fitting of the present invention in its assembled configuration and providing a 90° turn.

As shown most clearly in FIG. 4, the variable fitting 10 of the present invention comprises a first tubular member 12, a second tubular member 14 and a coupling nut 16 which is a threaded annular ring or nut. Each of tubular members 12 and 14 define an angled and generally cylindrical internal path 18. Each of tubular members 12 and 14 has a first and a second end, 20 and 22 for tubular member 12 and 24 and 26 for tubular member 14. Each of first ends 20 and 24 have external threads 28 and 30 for attachment to another fitting or a pipe (not shown).

Second end 26 of tubular member 14 is provided with external threads 32 on annular flange 33 which surrounds a female seat or recess 34 whose internal diameter is greater than generally cylindrical path 18 and whose annular surface 36 is radiused. Second end 22 of tubular member 12 is provided with an annular flange 38 that is sized to mate with recess 34 when first tubular member 12 and second tubular member 14 are assembled. According to the preferred embodiment of the present invention depicted in the various drawings, first tubular member 12 also includes an annular stop 23 which prevents over-tightening of an attached pipe to threads 28.

Coupling nut 16 has internal threads 40 sized to engage external threads 32 on annular flange 33 and includes an annular flange 42 whose functionality will be described hereinafter.

FIG. 1 is a cross-sectional view of coupling nut 16 showing annular flange 42 and threads 40, FIG. 2 is a cross-sectional view of tubular member 12 showing first and second ends 20 and 22, annular stop 23, threads 28, annular flange 38 and rear surface 44. FIG. 3 is a cross-sectional view of tubular member 14 showing first and second ends 24 and 26, external threads 30 and 32, annular flange 33, recess 34 and annular surface 36. FIG. 5 is a perspective view of the assembled pipe junction of the present invention showing tubular members 12 and 14 in the assembled configuration, external threads 28 and 30, coupling nut 16, and generally cylindrical internal path 18.

As shown most clearly in FIG. 4, assembly is accomplished by mating second end 22 of first tubular member 12 with second end 26 of tubular member 14 so that annular flange 38 mates with female recess 34, and then placing coupling nut 16 over first tubular member 12 such that threads 40 of coupling nut 16 engage threads 32. Upon tightening of this connection, annular flange 42 engages rear surface 44 of annular flange 38 thereby providing a secure mounting of flange 38 with recess 34. If appropriately and well manufactured to appropriate tolerances, this junction between annular flange 42 and rear surface 44 of annular flange 38 in combination with the mating of annular flange 38 with female recess 34, provides a water resistant seal when coupling nut 16 is tightened. This will be the case regardless of the material of fabrication of the swivel fitting of the present invention, but as will be well recognized by the skilled artisan will more easily be the case when the material of fabrication is plastic especially a polyvinyl or polyolefin.

In order to provide the greatest degree of rotation or the greatest number of possible assembly angles, it is preferred that the angle between a line drawn parallel to the surface of first end 20 and second end 22 of first tubular member 12 be about 45°. Similarly, the angle between a line drawn parallel to the surface of first end 24 and one drawn parallel to second end 26 of second tubular member 14 is preferably about 45°.

According to a preferred embodiment of the present invention, the radii of flange 38 and recess 34 are both about 0.125".

As can be seen from the foregoing description, the swivel fitting of the present invention provides an easily assembled pipe junction. During installation, the fitting is aligned with the appropriate path, the fitting assembled by inserting flange 38 into recess 34 at the angle necessary to follow the path and coupling nut 16 tightened. In its assembled form, swivel fitting 10 provides a smooth passage through generally cylindrical path 18 when an electrical or communications wire or cable is inserted from first end 24 of second tubular member 14 with no opportunity for that cable or wire to become trapped or hindered in its passage. Concommittantly, a water resistant joint is easily provided.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention be limited only by the scope of the appended claims.

What is claimed is:

1. A swivel fitting comprising:

an angular first tubular member and an angular second tubular member each of said first and said second tubular members having a first and a second end;

a first annular flange having radiused corners about said first end of said first tubular member;

a recess having radiused corners in a second annular flange about said second end of said second tubular member;

said first annular flange and said recess mating upon assembly of said first and second tubular members;

an annular threaded portion about said second annular flange;

and a coupling nut having an annular ring flange which engages said first annular flange when said coupling nut is tightened upon said annular threaded portion about said second annular flange.

2. The swivel fitting of claim 1 wherein angles formed by a) a line drawn parallel to said first end of said first tubular member and another line parallel to said second end of said first tubular member, and b) a line drawn parallel to said first end of said second tubular member and another line parallel to said second end of said second tubular member are both about 45°.

3. The swivel fitting of claim 2 fabricated from plastic.

* * * * *